March 24, 1931.  C. G. ORBEL  1,797,729
MULTIPLE SPINDLE MACHINE TOOL
Filed Dec. 13, 1928  8 Sheets-Sheet 2

Inventor:
Curt G. Orbel
by C. P. Goepel
his Attorney.

March 24, 1931. C. G. ORBEL 1,797,729
MULTIPLE SPINDLE MACHINE TOOL
Filed Dec. 13, 1928    8 Sheets-Sheet 3

Inventor:
Curt G. Orbel
by C. P. Goepel
his Attorney.

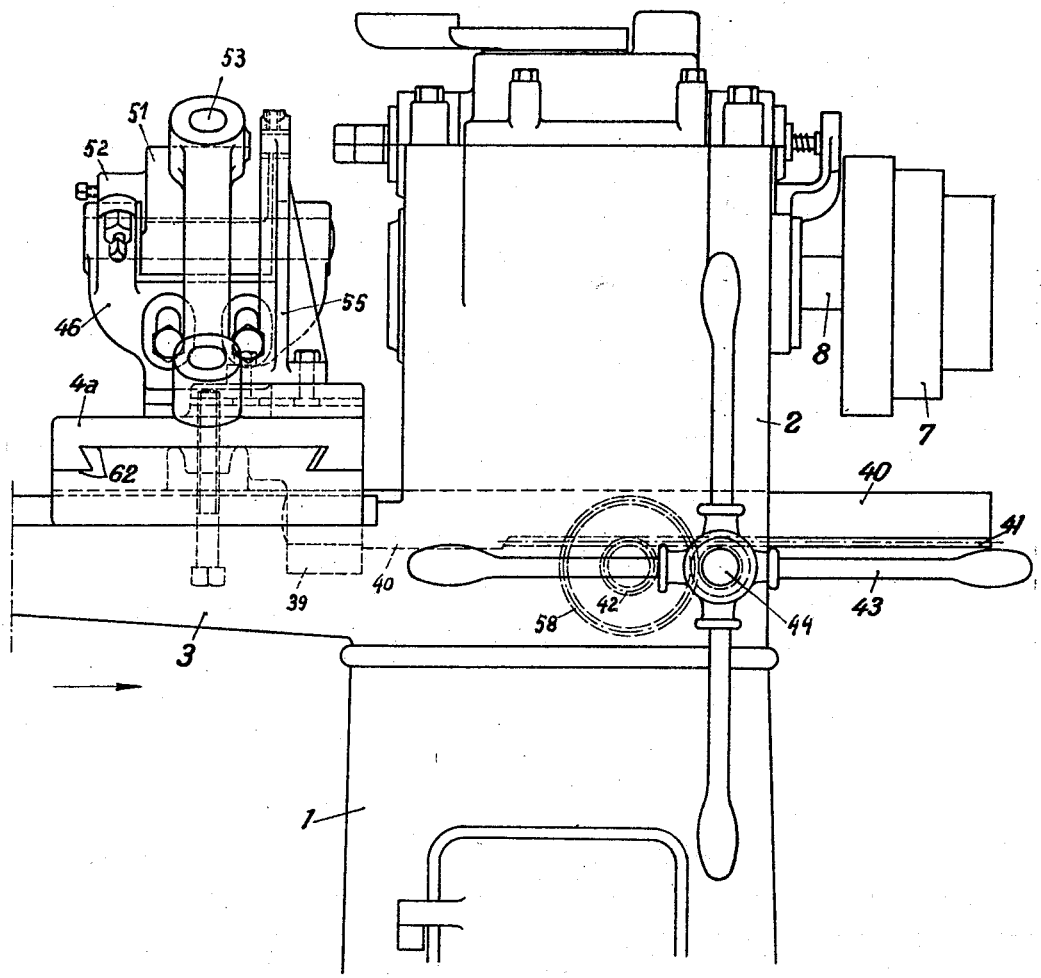

March 24, 1931.  C. G. ORBEL  1,797,729
MULTIPLE SPINDLE MACHINE TOOL
Filed Dec. 13, 1928   8 Sheets-Sheet 5

Inventor:
Curt G. Orbel
by C. V. Goepel
his Attorney.

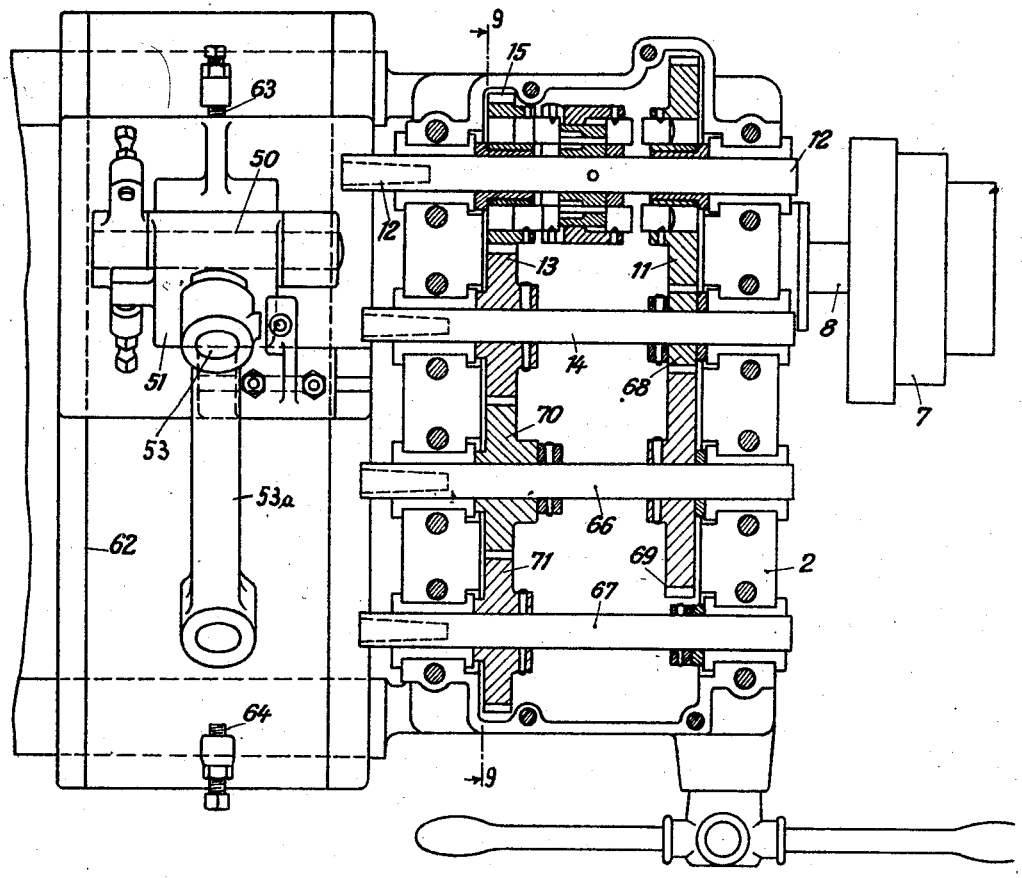

Inventor:
Curt. G. Orbel.

Patented Mar. 24, 1931

1,797,729

UNITED STATES PATENT OFFICE

CURT G. ORBEL, OF LEIPZIG, GERMANY, ASSIGNOR TO MÜLLER & MONTAG, GESELL-
SCHAFT, MIT BESCHRÄNKTER HAFTUNG, OF LEIPZIG, GERMANY, A GERMAN COM-
PANY

MULTIPLE-SPINDLE MACHINE TOOL

Application filed December 13, 1928, Serial No. 325,738, and in Germany December 24, 1927.

The invention relates to a multiple spindle machine tool. Machines of this kind are known, in which a boring spindle and a thread cutting spindle capable of being coupled by axial displacement with a forward or a backward drive are mounted in the machine frame. The object of the present invention is to effect with machines of this kind a saving in time with two or more spindles and labour by means of an adjustable arrangement of the holder for the work piece on a slide mounted so as to be slidable in the direction of the spindles, in such manner that the work piece holder can be brought successively into the positions necessary for the working of the said work piece by means of the tools mounted on the various spindles. In consequence of this the machine is particularly useful for the working of work pieces, on which a definite series of successive working operations has to be carried out, such as, for instance, taking the simplest case, the boring of a hole and the cutting of a female thread in the said hole. In this simplest case the adjustable work piece holder is arranged so as to be capable of swinging between stops on the slide which is slidable in the direction of the spindles, in such manner that the said work piece holder takes up in its one end position the position necessary for the start of the boring operation and in its other end position the position necessary for the thread cutting operation.

When it is desired to carry out more than two working operations on the same workpiece by the aid of different tools, the swinging workpiece holder is mounted on a slide which is mounted so as to be slidable transversely to the direction of the spindles, the transverse motion of the slide being limited by stops in such manner that in each of the two end positions of the slide determined by the stops the workpiece can be adjusted by swinging the workpiece holder between its stops with regard to the two tool spindles.

The number of tool spindles may be further increased by the provision of intermediate positions for the slide.

Two preferred constructional forms according to the invention are illustrated by way of example in the accompanying drawings.

Fig. 6 is an elevation of a modified form of construction,

Figure 7:
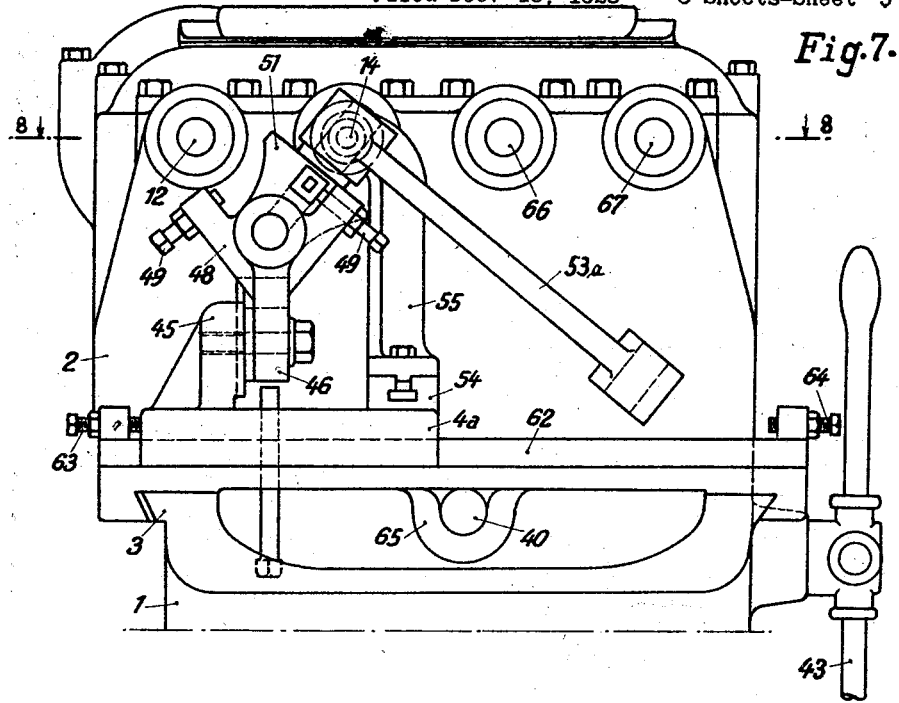
Figure 9:
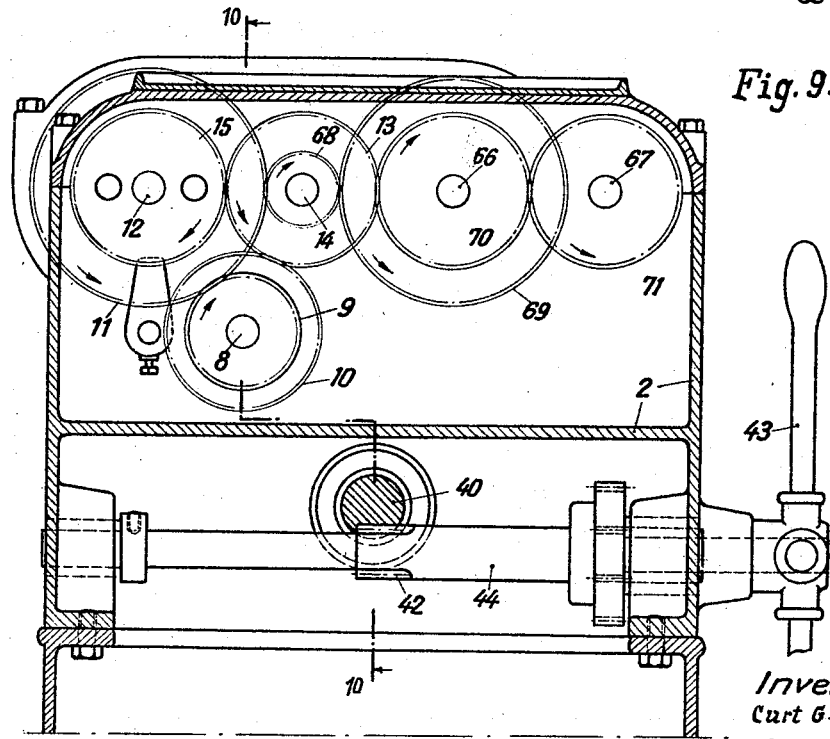
Figure 10:
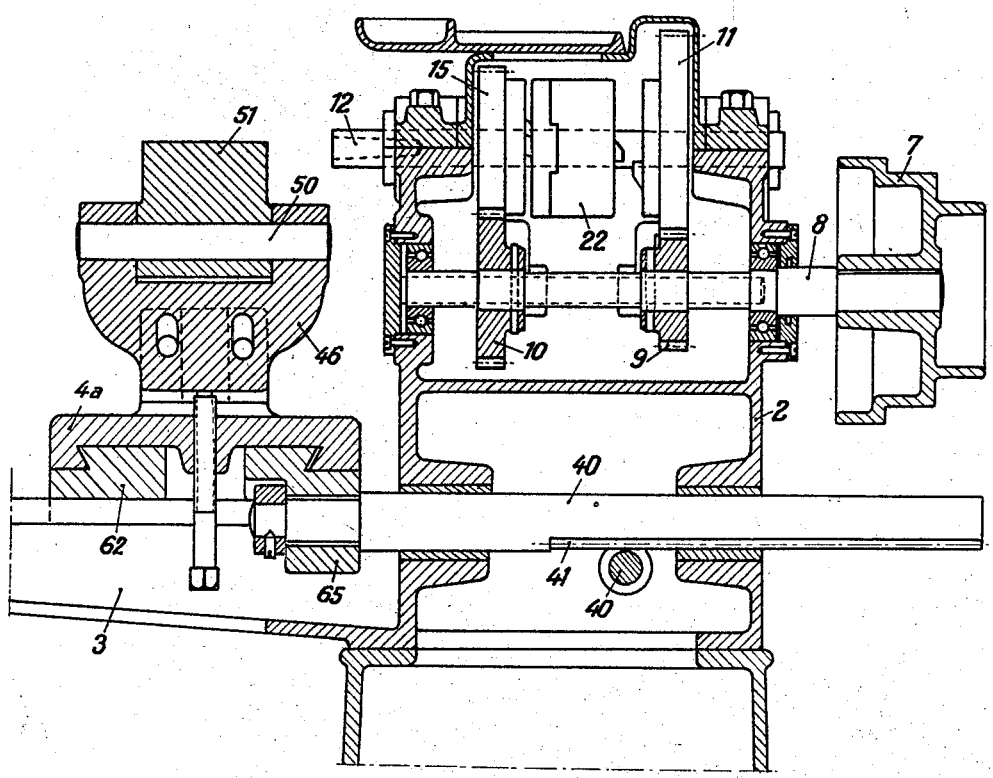

Fig. 7 is a side view of the upper part of the machine seen in the direction of the arrow drawn in Fig. 6, Fig. 8 is a horizontal section on line 8—8 of Fig. 7, Fig. 9 is a vertical section on line 9—9 of Fig. 8, Fig. 10 is a vertical section on the broken line 10—10 of Fig. 9.

Figure 11:
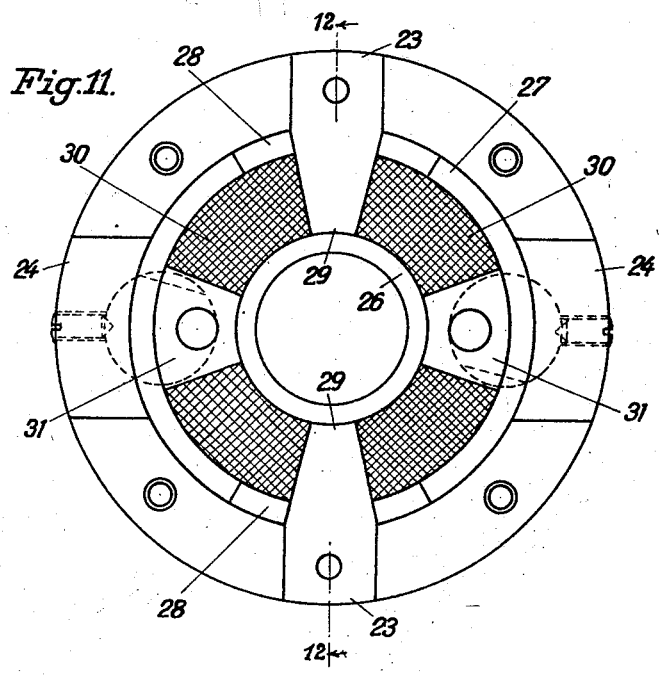
Figure 12:
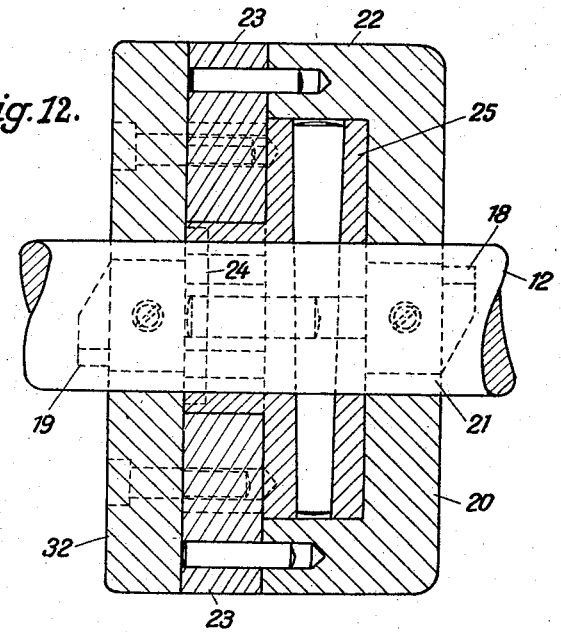

Fig. 11 shows on a larger scale a view of the coupling of the thread cutting spindle after removal of the closing plate and Fig. 12 is a section on line 12—12 of Fig. 11.

On a box-like lower frame 1 is fixed a spindle box 2 having a lateral projection 3, which is formed as a guide for the work piece slide 4. In the side walls 5, 6 of the spindle box is mounted a driving shaft 8 provided with a stepped pulley 7, on which shaft are pinned two gears of different size, a smaller one 9 and a larger one 10. The smaller gear 9 engages with a gear 11, which is loosely mounted on a spindle 12 journalled in the side walls 5, 6 of the spindle box and the gear 10 of the driving shaft engages with a gear 13, which is pinned to a spindle 14 journalled at the same height as the spindle 12 in the side walls 5, 6 of the spindle box. The gear 13 engages with a gear 15 loosely mounted on the spindle 12. The two gears 11, 15 loosely mounted on the spindle 12 are secured against sliding on the one hand by means of the bearing walls 5, 6 and on the other hand by means of stops 35, which are fixed on a rod 36 fixed in the bearing walls 5, 6 the said wheels 11, 15 being provided on the sides adjacent to one another with coupling devices in the form of coupling claws 16 and 17 respectively. Between the two gears 11, 15 a coupling member with coupling claws 18, 19 arranged on both sides is mounted on the spindle 12. The coupling claw 18 is adapted to enter into engagement with the claw 16 of the gear 11, while the other claw 19 is adapted to engage the claw 17 of the gear 15, according to the axial displacement of the coupling member.

The coupling (Figs. 11 and 12) consists of a dished part, which is closed on the open side by means of a cover. The dished part consists of a disc 20 with a central bore 21 for the spindle 12 and an annular peripheral projection 22, in which two recesses of considerable depth but lesser breadth 23 and two peripheral recesses 24 of considerable breadth but lesser depth are arranged diametrically opposite and displaced in pairs relative to one another by 90°. In the space enclosed by the annular projection 22 a disc 25 is inserted, which is fixed by means of pins to the spindle 12 and is provided on one side with an inner annular projection 26 and an outer annular projection 27, the latter of which is provided with two diametrically opposite recesses 28 reaching inwardly to the face of the disc 25. In the peripheral recesses 23 of the dish-shaped coupling part 20, 22, tongues 29 are inserted flush and fixed by means of pins, the inwardly projecting wedge-shaped ends of which pins project through the recesses 28 of the outer peripheral projection 27 of the disc 25 and are held in on both sides by rubber wedges 30, which are inserted between the inner and outer annular projections 26 and 27 of the disc and are held tight by means of intermediate pieces 31 fixed with screws. The open side of the dished part is closed by means of a covering disc 32 which is screwed on. The latter and the dished coupling part 20 are provided on the side surfaces with projecting coupling claws 18, 19 as aforesaid, which on axial displacement of the spindle 12 enter into engagement with the coupling claws 16, 17.

The spindle 12 is the thread cutting spindle. Through the pressure of the work piece on the spindle, the latter becomes coupled with the rotating toothed wheel 11 and thereby compresses a spring 37, which on cessation of the pressure of the work piece pushes back the spindle, whereby it is uncoupled from the gear 11 and coupled with the gear 15, which rotates in the opposite direction at a higher speed, in order to withdraw the tap.

The spindle 14 is the boring spindle and is provided with a ball thrust bearing 38 to enable it to take up the pressure of the work piece.

The work piece slide 4, which is slidable on the slide bed 3 is provided on the under side of its sliding foot plate with an eyelet 39, in which a pull or push rod 40, as the case may be, is fixed. The rod 40 is provided on the under side with a gear drive 41, in which a pinion 42 engages, which is mounted together with a larger gear 58 on a shaft 59. With the gear 58 a gear 60 engages, the latter being arranged at the end of a shaft 44 which is journalled in the front wall of the spindle box and is provided with a capstan 43. According to the direction of rotation of the capstan, the work piece chuck slide is pushed to or fro. On the foot plate of the slide 4 a fixed guide member 45 with a vertical guide surface is mounted, on which a movable guide part 46 is arranged so as to be slidable in vertical direction and adjustable by means of screw bolts and nuts. The movable guide member is constructed in the form of a bearing fork with two bearing eyelets 47. The front bearing eyelet is provided on both sides of the bearing bore with two extensions 48, in which two adjustable stop screws 49 are screw-threaded at an angle to one another. In the bearing eyelets 47, the work piece holder proper 51 for the work piece is mounted by means of a bolt 50 so as to be capable of swinging, the said holder being provided with a stop projection 52, which co-operates with the stop screws 49.

Figure 1:
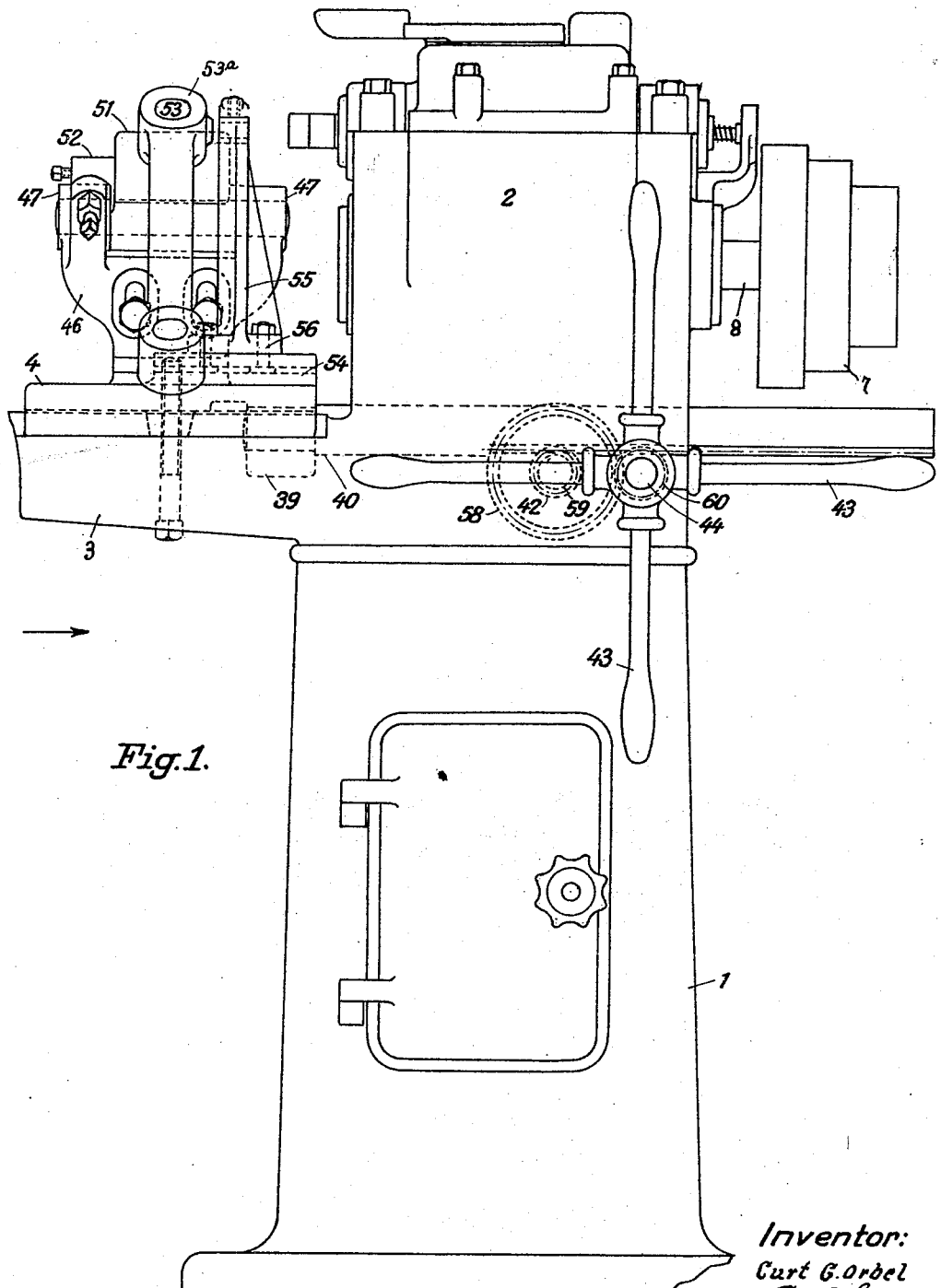
Fig. 1 is an elevation of a machine according to the invention in which two spindles are provided for boring and thread cutting.
Figure 2:
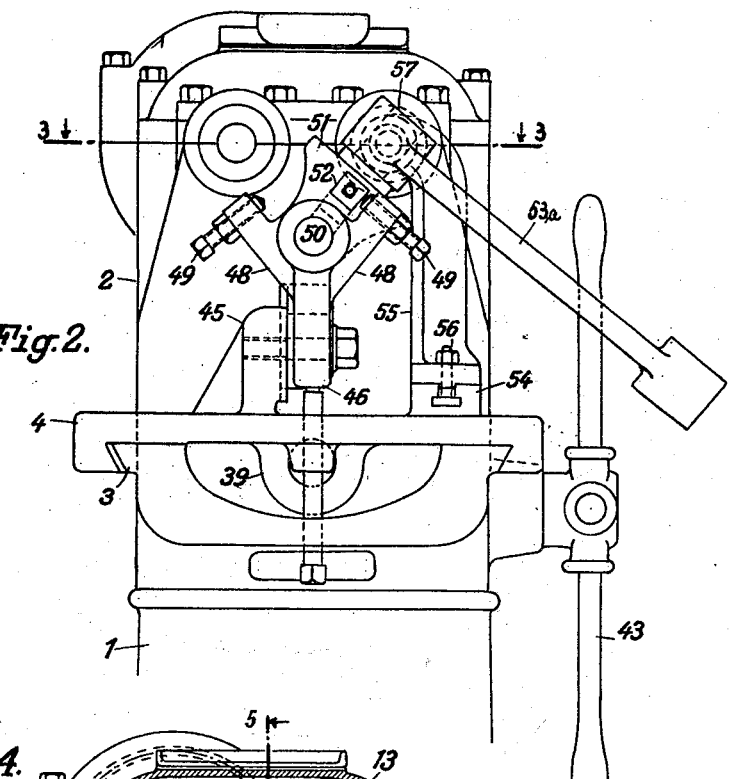
Fig. 2 is a side view of the upper part of the machine seen in the direction of the arrow drawn in Fig. 1.
Figure 4:
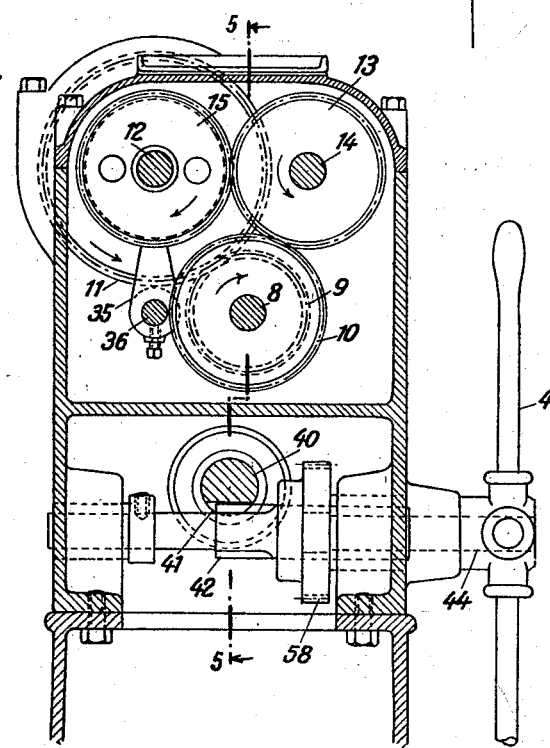
Fig. 4 is a vertical section on line 4—4 of Fig. 3.
Figure 5:
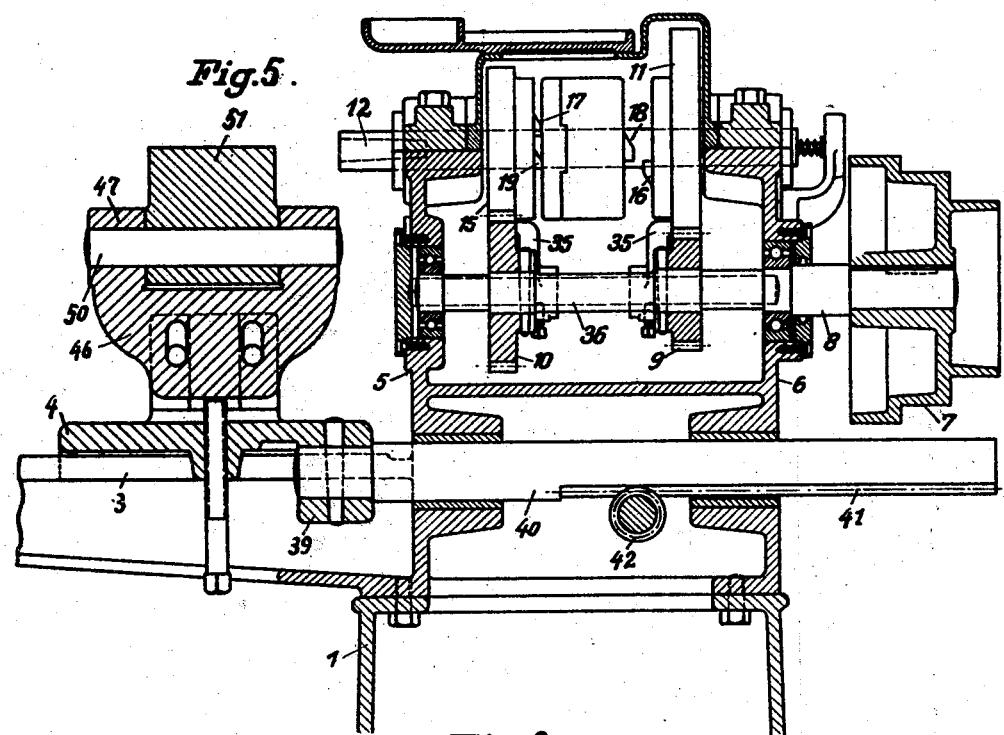
Fig. 5 is a vertical horizontal section on the broken line 5—5 of Fig. 4.
Figure 3:
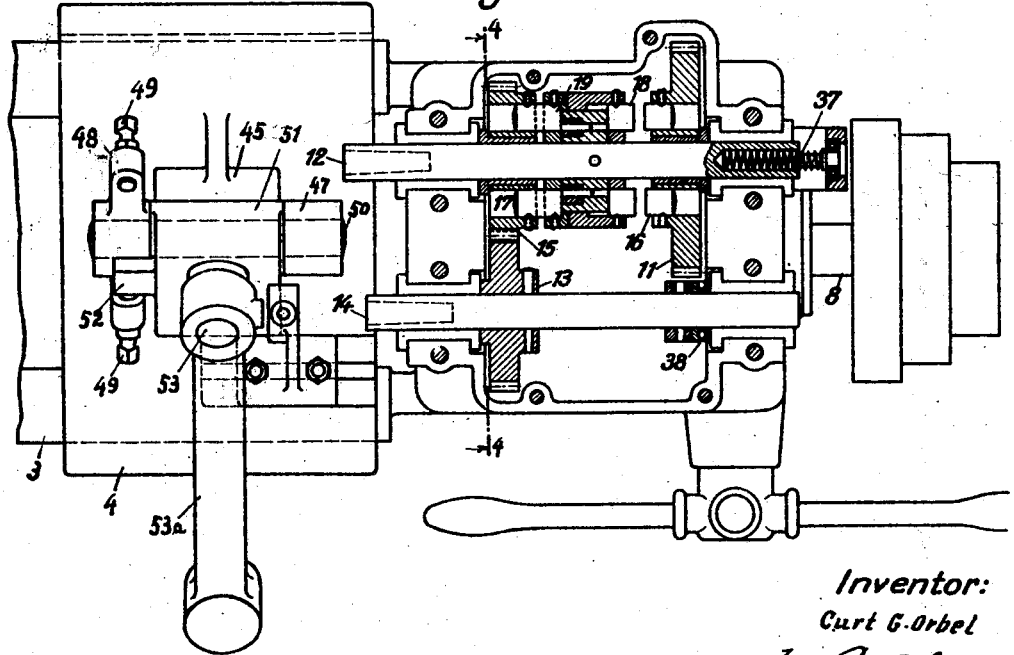
Fig. 3 is a horizontal section on line 3—3 of Fig. 2.

The work piece holder 51 may be of any desired suitable form. For the production of screw threads in the hubs of forks and the like radially to the hub bore, the swinging work piece holder is preferably provided with a radial bore, into which interchangeable pins 53 of various diameters for holding the work pieces 53a by the side of the already existent hub bore can be inserted or screwed. For the production of the radial hub bore the work piece is swung to the right until it strikes upon the right-hand stop screw 49 (Fig. 2), whereupon the slide is drawn against the boring spindle by means of the capstan 43. After production of the bore the slide is pushed back, the work piece holder is swung to the left until its projections strikes on the left-hand stop screw 49, whereupon the work piece is in the position necessary for the cutting of the thread. Then the slide is again drawn forward by means of the capstan, whereby the thread cutting spindle 12 is coupled with the gear 11. When the thread is completely cut, the slide is pushed back, the spindle following under the action of the spring 37, whereby the spindle 12 is uncoupled from the gear 11 and coupled with the gear 15, so that it now runs in the reverse direction and the thread cutter is withdrawn by rotation from the work piece.

For the guiding of the boring tool an arm 55 is also fixed by means of bolt 56 on an extension 54 of the slide 4, which extension is provided with the guide slit, its arm being provided at the upper end with a guide eyelet 57 having an interchangeable guide bushing for the boring tool.

In Figs. 6 to 10 the machine is represented as having four tool spindles, and the slide 61 is mounted so as to be slidable in the direction of the spindles on the slide bed 3 arranged on the spindle box 2. The slide 61 is provided with a transverse slide bed 62 for a slide 4a on which the work-piece holder 51 is arranged. The slide 4a is slidable between two stop screws 63, 64 which each determine one end position of the slide in which the belt 50 of the workpiece holder 9 is in such a position with regard to each of the tool spindles 12, 14 and 66, 67 respectively, that the workpiece can be brought by swinging the workpiece holder 51 into the position necessary for the working operation to be effected by the one or the other of the spindles of the two pairs of spindles.

The pull or push rod 40 serving for bringing up the workpiece to the tools and removing the said workpiece therefrom is fixed in an eyelet 65 provided on the slide 62.

In the spindle box 2 the two spindles 12, 14 and 66, 67 are journalled side by side at the same height. The drive is effected in known manner from the stepped pulley 7 of the driving shaft 8, through the gears 9, 11 and the coupling 16, 18 for the forward drive or through the gears 10, 13, 15 and the couplings 17, 19 for the reverse drive, to the spindle 12 and through the gears 10, 13 directly to the spindle 14.

The spindle 66 is driven from the gear 11 by means of the loose intermediate wheel 68 mounted on the spindle 14 and the gear 69 which is pinned on to the spindle 66, whilst the spindle 67 is driven from the gear 13 mounted on the spindle 14 through an intermediate wheel 70 mounted loosely on the spindle 66 and a gear 71 which is pinned on the spindle 67.

I claim:

1. In a multiple spindle machine tool, the combination of: spindles, tools mounted on said spindles, a work piece holder and a supporting guide therefor, a base guide with a vertical face to which the supporting guide is mounted for vertical displacement, a slide carrying the base guide, and a slide bed on which said slide is mounted so as to be slidable in the direction of said spindles, said supporting guide being formed with bearing arms between which the work piece holder is mounted by a pivot pin for adjustment to various positions so that the work piece takes up for every adjustment of the holder the necessary position for being operated upon by one of said tools.

2. In a multiple spindle machine tool, the combination of: spindles; tools mounted on said spindles; a workpiece holder and a supporting guide therefor, a base guide with a vertical face to which the supporting guide is mounted for vertical displacement; a slide carrying the base guide; a slide bed on which said slide is mounted so as to be slidable in the direction of said spindles; said supporting guide being formed with bearing arms between which the work piece holder is mounted by a pivot pin for adjustment in an arc of which the pivot pin is the center; and stops on the supporting guide laterally of said workpiece holder, between which stops said workpiece holder is adapted to swing on an arc in such manner that the work piece in the one end position of the holder takes up the position necessary for the operation of one tool, and in the other end position takes up the position necessary for the operation of another tool.

3. In a multiple spindle machine tool, a combination as specified in claim 1, wherein said spindles consist of a boring spindle and a thread cutting spindle, in further combination with: a driving shaft with which said thread cutting spindle is capable of being coupled for forward and backward running by axial displacement, and two coupling wheels serving for the coupling of said thread cutting spindle, one of said coupling wheels being driven directly from said driving shaft and the other of said wheels being driven from said driving shaft through the intermediary of said boring spindle.

4. In a multiple spindle machine tool, a combination as specified in claim 2, in which said stops are arranged at an angle to one another on said supporting guide and are adjustable.

5. In a multiple spindle machine tool, a combination as specified in claim 1, wherein said workpiece holder is provided with an interchangeable pin for the reception of the workpieces which are provided with a bore and which are intended to receive a female threaded bore at right angles to said first named bore.

6. In a multiple spindle machine tool, a combination as specified in claim 1, wherein said slide is provided with an adjustable arm having an eyelet carrying an interchangeable guide bush.

7. In a multiple spindle machine tool, a combination as specified in claim 1, wherein a second slide carries the supporting guide, said second slide being mounted on the first slide so as to be slidable thereon transversely to the direction of said spindles, in further combination with stops adapted to limit the transverse motion of said second slide.

8. In a multiple spindle machine tool, a combination as specified in claim 1, wherein said slide is mounted on said slide bed so as to be slidable thereon transversely to the direction of said spindles as well as in the said direction, in further combination with stops adapted to limit the transverse motion of said slide in such manner as to determine its location in one of two end positions, in each of which positions the workpiece holder can be swung into positions necessary for the operation of two of said tools, and further stops adapted to limit the swinging movement of said workpiece holder.

CURT G. ORBEL.